Aug. 28, 1928.

T. SPOONER 1,682,435

MAGNETIC ANALYSIS OF DRILLS

Filed Oct. 25, 1921

WITNESSES:

INVENTOR
Thomas Spooner.
BY
ATTORNEY

Patented Aug. 28, 1928.

1,682,435

UNITED STATES PATENT OFFICE.

THOMAS SPOONER, OF EDGEWOOD PARK, PENNSYLVANIA, ASSIGNOR TO WESTINGHOUSE ELECTRIC & MANUFACTURING COMPANY, A CORPORATION OF PENNSYLVANIA.

MAGNETIC ANALYSIS OF DRILLS.

Application filed October 25, 1921. Serial No. 510,320.

This invention relates to testing, more particularly to magnetic analysis of articles, such as hardened machine tools, for instance drills, reamers and the like.

Hitherto, in testing tools of this character, it was customary to select, at random, from a large number of tools, a small number which was tested for hardness and wearing qualities by destructive tests. Based on results of tests on a very small number of tools, the character of the remaining tools was considered as having been ascertained. This procedure was very inefficient in that the results of tests on certain articles were relied upon to indicate the character of others not tested.

The present invention has, among its objects, to provide a method of and apparatus for testing machine tools and materials which shall be simple and effective, and whereby the character of such tools and materials may be readily ascertained by relatively unskilled workmen.

It is a further object of this invention to provide a method of and apparatus for testing which is capable of determining the qualities of materials and tools without destructive tests.

In practising my invention, I provide a magnetic circuit of which a tool or other article to be tested forms a part and which also contains a standard tool or article of known quality. Magnetic fluxes are induced in this circuit and the differences in magnetic characteristics of the two articles is ascertained by reading the deflections on a sensitive movable armature which is so placed as to be affected by the fluxes in the magnetic circuit.

In the accompanying drawing constituting a part hereof and in which like reference characters designate like parts, Fig. 1 is a plan view of an apparatus embodying my invention;

Figure 1:
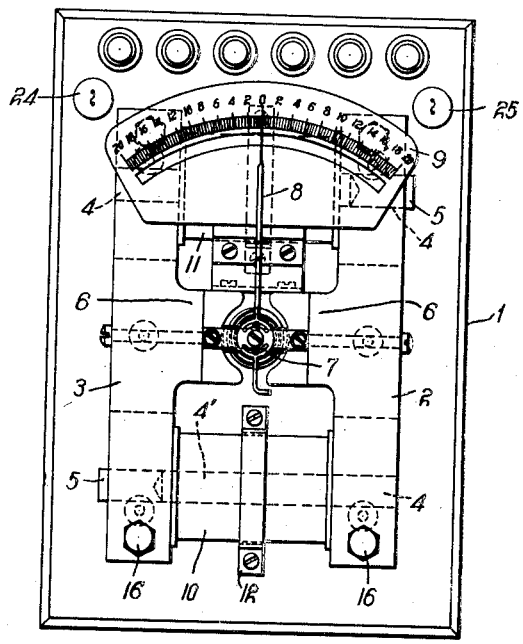

The apparatus comprises a base 1, usually of any suitable insulating material, that has secured thereto a pair of yokes 2 and 3, generally consisting of soft iron or steel of high permeability. Alined openings 4 are formed in opposite ends of yokes 2 and 3, a plug 5 is placed in one end of one of the openings 4 in yoke 2 and another plug 5 placed in a diagonally opposite opening 4 in yoke 3. Projecting portions or pole pieces 6 are formed centrally of yokes 2 and 3 to extend inwardly and embrace the movable armature 7 which has a pointer 8 secured to the moving coil thereof to move over a scale 9 secured to base 1 in any suitable manner.

Figure 2:
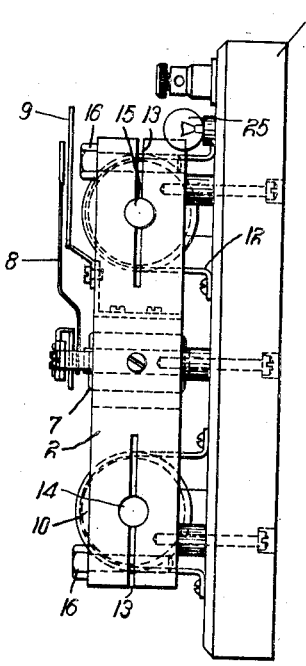
Fig. 2 is a side elevational view thereof.

Coils 10 and 11 are placed within the ends of yokes 2 and 3 and are secured in position by straps 12. Openings 4' in said coils are so formed that they aline with openings 4 of the yokes. The yokes are split horizontally, as shown at 13, Fig. 2, and articles or materials 14 and 15 to be tested are inserted in alined openings 4, screws 16 being provided to securely clamp said articles in position on the apparatus. Coils 10 and 11 are connected in series by conductors 17 which also connect said coils to two pairs of poles of a three-pole double-throw reversing switch 20. In the circuit 17 is inserted a resistor 18 adapted to be short-circuited by a switch 19. Connected to the two opposite central poles of switch 20 is a circuit comprising a source of energy, such as a battery 21, a resistor 22 and an ammeter 23.

Lamps 24 and 25 are placed near the yokes 3 and 2, respectively, and are connected to the third set of poles of switch 20 by conductors 26. A conductor 27 is connected to a point between lamps 24 and 25 and to the central opposite pole of switch 20, a battery 28 being inserted in the circuit.

The movable armature 7 is energized through a circuit containing battery 29, resistor 30, and ammeter 31.

Figure 3:
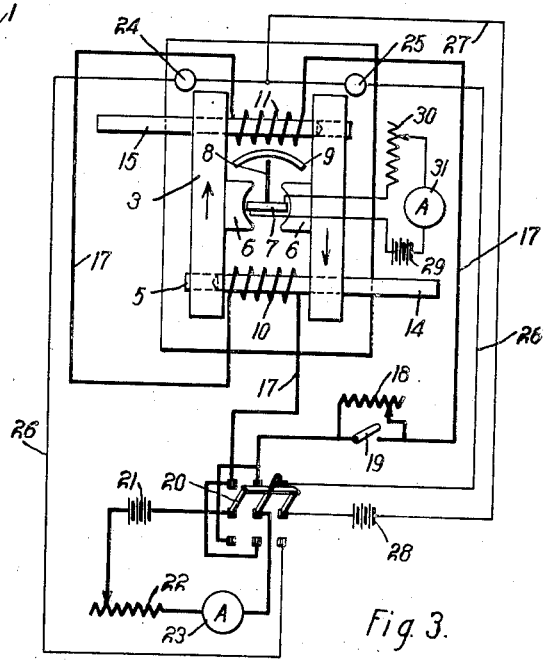
Fig. 3 is a diagrammatic view of my apparatus, showing the electrical connections thereof.

In operating my magnetic testing apparatus, a standard drill 14, for instance, is inserted in the apparatus and clamped by screws 16, the current flowing through the movable armature 7 having been previously adjusted, and switch 20 being closed in the upper position. A flux is thus produced in the magnetic circuit, as shown by the arrows, Fig. 3, and causes lamp 25 to light and pointer 8 to be deflected to the right. An unknown drill 15 is then inserted in the opposite end of the apparatus and is secured in place.

If the unknown drill is weaker magnetically than the standard drill, the deflection of pointer 8 on scale 9 will be to the right. Since the right-hand lamp 25 is lighted and the pointer 8 deflects to the right, the reading is arbitrarily considered as minus, indicating that the drill being tested has less permeability than the standard drill. Switch 20 is opened and the reading then taken, indicating the difference of remanent magnetism of the samples. Switch 19 is then opened and switch 20 is closed in the lower position, resistor 18 having first been adjusted so that the coercive force exerted on standard drill 14 is sufficient to reduce its magnetism to zero. In this position of the apparatus, lamp 24 is lighted and, if the deflection of pointer 8 is to the left, the indication of the unknown sample is minus.

The procedure is now repeated several times to obtain several readings which are averaged to give a mean set of values. The three points obtained in this test, namely the difference in maximum permeability, remanent magnetism, and coercive force are usually sufficient to give a very good indication of the physical characteristics of a material. If a standard drill, which is known to have the desired physical properties, is used, an apparatus such as described enables the user to determine very readily whether or not the unknown drills are of the correct chemical composition and have received the proper heat treatment.

My new apparatus has many advantages over apparatus hitherto used or suggested for testing of materials of this kind. The apparatus is very sensitive, since the movable armature may be adjusted to give large deflections with small fluxes because differences in fluxes are noted instead of the actual fluxes produced with any one sample in the circuit. The apparatus is very accurate in that there are no compensating coils, and leakage effects are balanced. Since the results are stated in terms of a standard, it is unnecessary to periodically calibrate the instrument.

I claim as my invention:

1. A testing apparatus comprising a plurality of magnetic yokes, means for allowing the insertion of articles to be tested between said yokes, pole pieces formed centrally thereon, a movable armature between said pole pieces, and coils between the outer ends of said yokes.

2. A testing apparatus comprising a plurality of magnetic yokes, pole pieces formed centrally thereon, a movable armature between said pole pieces, coils between the outer ends of said yokes, and alined openings in said coils and yokes for allowing the insertion of articles to be tested.

3. A testing apparatus comprising a plurality of magnetic yokes, pole pieces formed centrally thereon, an armature between said pole pieces, coils between the outer ends of said yokes, alined openings in said coils and yokes for allowing the insertion of articles to be tested, and means for securing said articles therein.

In testimony whereof, I have hereunto subscribed my name this 18th day of October 1921.

THOMAS SPOONER.